Dec. 11, 1923.

H. BROOKS

POTATO KNIFE

Filed June 22, 1923    2 Sheets-Sheet 1

Harry Brooks.
INVENTOR

Dec. 11, 1923.

H. BROOKS

POTATO KNIFE

Filed June 22, 1923

Harry Brooks.
INVENTOR

BY *Victor J. Evans*
ATTORNEY

WITNESS:

Patented Dec. 11, 1923.

1,477,421

UNITED STATES PATENT OFFICE.

HARRY BROOKS, OF UNIONTOWN, PENNSYLVANIA.

POTATO KNIFE.

Application filed June 22, 1923. Serial No. 647,195.

*To all whom it may concern:*

Be it known that I, HARRY BROOKS, a citizen of the United States, residing at Uniontown, in the county of Fayette and State of Pennsylvania, have invented new and useful Improvements in Potato Knives, of which the following is a specification.

This invention contemplates the provision of a device by means of which potatoes can be cut into small cubes, or in long strips or pieces for French frying, the invention residing in the construction, combination and arrangement of parts as claimed.

In the drawings forming part of this application, like numerals of reference indicate similar parts in the several views, and wherein.

Figure 1:
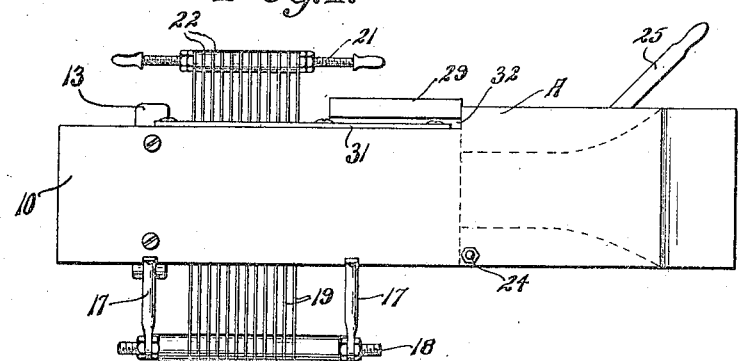
Figure 1 is a side elevation of the invention.
Figure 2:
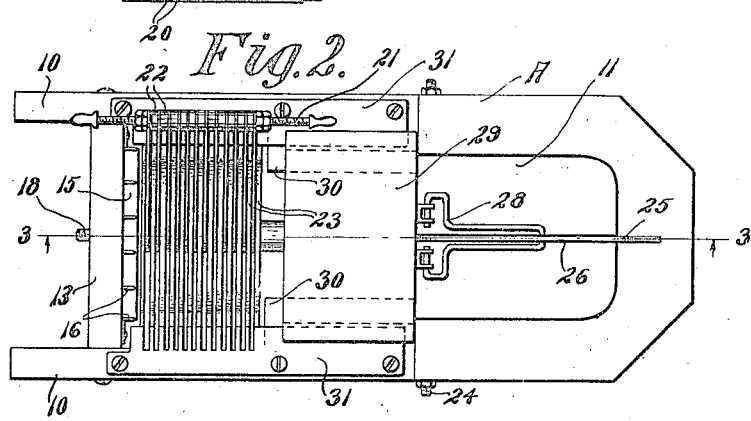
Figure 2 is a top plan view.
Figure 3:
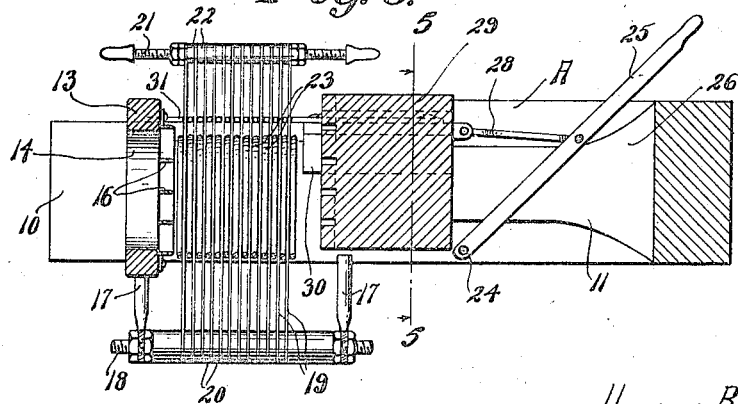
Figure 3 is a sectional view taken on the line 3—3 of Figure 2, looking in the direction of the arrows.
Figure 4:
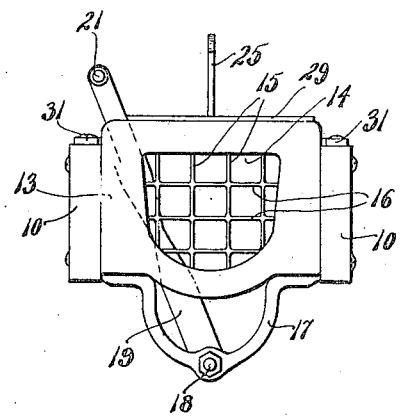
Figure 4 is an end elevation.
Figure 5:
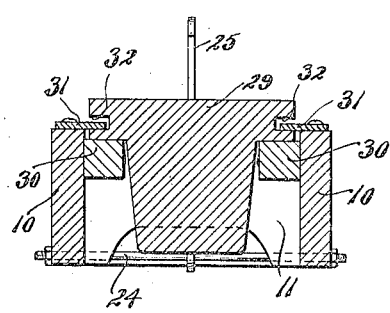
Figure 5 is a sectional view taken on the line 5—5 of Figure 3, looking in the direction of the arrows.
Figure 6:
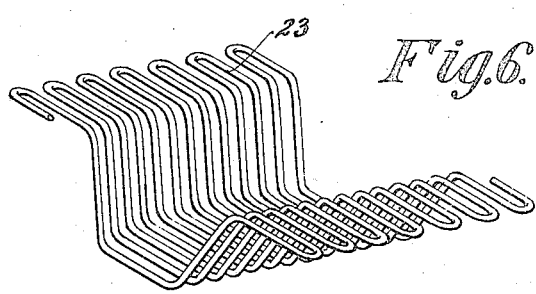
Figure 6 is a perspective view of the blade guides.
Figure 7:
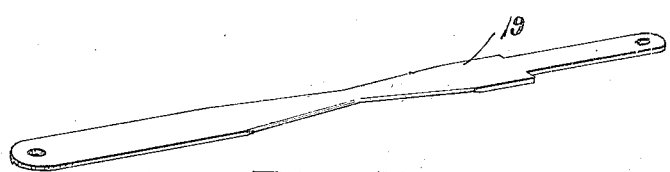
Figure 7 is a view of one of the cutting blades.

Referring to the drawings in detail, A indicates a frame like supporting structure for the component parts of the device, and which frame includes spaced parallel members 10 which are connected together by a bottom portion 11 which terminates an appreciable distance from one end of the frame so as to provide an open space between the parallel sides 10 for a purpose to be hereinafter described. The members are further connected together adjacent their free ends by a block 13 which has an opening 14 therein. Carried by this block 13 is what I term a cutting frame made up of a plurality of vertical cutting blades 15 which are traversed by a plurality of spaced transverse cutting blades 16. These blades defining a unitary structure adapted to be secured to the block 13 at one side thereof in advance of the opening 14 of said block.

Depending from the sides 10 of the supporting structure are spaced yokes 17 which provide supports for a shaft 18 arranged longitudinally of the supporting frame centrally thereof. Pivoted on this shaft 18 is a plurality of cutting blades 19, the latter being suitably spaced apart by spacing elements 20. These blades are also connected by a handle bar 21 which passes through aligned openings adjacent the upper ends of these blades, the handle bar also supporting spacing elements 22 to hold the blades equidistantly spaced throughout their length. It will be noted from an inspection of the drawings that each of these blades is provided with a relatively wide intermediate portion, the opposite edges of which are sharpened to provide cutting edges, so that the blades function to cut the potato in slices when swung from either side of the supporting structure. These series of blades are arranged vertically in the space between the side members 10 of the supporting structure extending an appreciable distance above the latter so that the handle bar can be conveniently grasped to swing the blades in series from one side of the frame to the other. Supported by the side members 10 of the supporting structure is a plurality of U-shaped guides 23 arranged side by side, and preferably formed from wire, although any suitable material may be used for this purpose. There is one of these guides for each blade of said series, the blades passing through the lower portions of these guides for association with the shaft 19 upon which the blades are mounted for pivotal movement but by reason of the configuration of the guides, they also receive the blades of said series when the latter are swung the limit of their movements laterally in either direction.

Supported by the frame A and wholly to one side of the open space thereof is a transverse shaft 24 upon which is pivoted an operating lever 25. The bottom portion 11 of the supporting structure is slotted as at 26 to permit the lever 25 to be swung upon the shaft 24 longitudinally of the supporting frame. This lever 25 is associated with a link 28, the latter being pivotally connected with a plunger or follower 29, preferably in the nature of a block mounted to slide over the top of the guides for the movable blades. This follower is supported in an inactive position wholly to one side of said guides by supporting elements 30, and is guided in its movements by a guide 31 supported by one of the parallel members 10 of the frame and arranged to be received by a groove 32 formed in one side of the follower. The device is very simple in construction and can be conveniently manipulated to cut potatoes in quick order in pieces of different sizes and shapes depending upon how the potatoes are to be cooked or prepared.

In practice, when it is desired to cut the potatoes into small cubes, the series of movable blades are arranged wholly to one side of the space between the parallel members 10 and received by the guides therefor at this particular side of the structure. The potato is then arranged upon the lower portions of these guides, and supported thereby, after which the series of movable blades are swung upon their pivots across the open space of the frame like structure to the opposite side thereof. The blades of course pass through the potato cutting the latter into slices, after which the follower is moved through the guides in the direction of the open end of the frame. The sliced potato is thus forced through the cutting frame made up of the stationary blades 15 and 16 respectively, the arrangement of which is such that the slices are subsequently cut up into small cubes or blocks. As the potato is forced into the cutting frame just referred to, the small cubes or blocks pass through the central opening 14 of the end wall or block 13 of the frame and are disposed in a suitable receptacle arranged beneath the structure (not shown). If it is desired to cut the potato into long strips for French frying, the potato, after being arranged upon the guides constituting a support for the potato, is moved by the follower in the direction of the cutting frame, without resorting to the use of the movable cutting blades. In other words, the potato is not sliced transversely in such instance, but is simply forced through the stationery cutting frame made of the stationary blades 15 and 16 with the result that the potato is cut into elongated strips or pieces. The device is extremely simple in construction and can be manipulated in a very convenient manner so that a large number of potatoes can be cut into pieces of the desired size and shape in quick order.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A potato cutting device comprising a frame like supporting structure having an opening at one end, a cutting frame supported by said end at one side of the opening, and including spaced vertical and horizontally disposed blades, means for supporting a potato on said structure, means for forcing the potato through the cutting frame, and means for slicing the potato transversely into a plurality of pieces prior to forcing the potato through the cutting frame.

2. A potato cutting machine comprising a frame like supporting structure having an opening at one end, a cutting frame supported by said end in advance of said opening and including spaced vertical and horizontally disposed blades, a plurality of U-shaped guides supported by the frame and upon which the potato is adapted to be arranged to be cut, a series of vertically disposed blades movable through said guides and pivoted at their lower ends to be swung from one side to the other of said frame, the blades of said series having cutting edges on both sides whereby the potato is cut into a number of slices when said series of blades are moved in either direction, and means for subsequently forcing the potato through said cutting frame to cut the potato into small cubes or blocks.

3. A potato cutting device comprising a frame like supporting structure having an opening in one end thereof, a cutting frame supported by said end in advance of said opening and including spaced vertical and horizontally disposed blades, means for supporting the potato upon the frame like structure, means for cutting the potato transversely into a plurality of slices, a follower mounted for movement longitudinally of the frame, whereby the potato is subsequently forced through the cutting frame to cut said slices into a plurality of cubes or blocks, a lever pivoted adjacent one end of said frame to control the movements of said follower, and a link providing a pivotal connection between the lever and said follower.

In testimony whereof I affix my signature.

HARRY BROOKS.